US007974391B2

(12) United States Patent
Drewry et al.

(10) Patent No.: US 7,974,391 B2
(45) Date of Patent: Jul. 5, 2011

(54) CONVERSATION-BASED USER INTERFACE

(75) Inventors: John S. Drewry, San Jose, CA (US); Steven D. Schramm, San Jose, CA (US); Mike White, San Jose, CA (US); Kate Withey, San Jose, CA (US)

(73) Assignee: Orative Corporation, San Jose, CA (US)

( * ) Notice: Subject to any disclaimer, the term of this patent is extended or adjusted under 35 U.S.C. 154(b) by 21 days.

(21) Appl. No.: 11/509,113

(22) Filed: Aug. 23, 2006

(65) Prior Publication Data

US 2007/0047697 A1 Mar. 1, 2007

Related U.S. Application Data

(63) Continuation-in-part of application No. 10/890,922, filed on Jul. 14, 2004.

(60) Provisional application No. 60/487,143, filed on Jul. 14, 2003, provisional application No. 60/710,998, filed on Aug. 23, 2005, provisional application No. 60/711,051, filed on Aug. 23, 2005, provisional application No. 60/711,053, filed on Aug. 23, 2005.

(51) Int. Cl.
*H04M 11/00* (2006.01)
*H04M 3/42* (2006.01)

(52) U.S. Cl. .................................... 379/88.14; 455/415

(58) Field of Classification Search ............ 379/202.01, 379/215.01, 211.02, 88.11, 88.14; 455/415
See application file for complete search history.

(56) References Cited

U.S. PATENT DOCUMENTS

| 3,859,464 | A | * | 1/1975 | Seamans ................... 379/81 |
| 5,732,348 | A | | 3/1998 | Norimastsu |
| 5,903,629 | A | | 5/1999 | Campbell |
| 6,092,097 | A | | 7/2000 | Suzouka |
| 6,147,977 | A | | 11/2000 | Thro |
| 6,272,214 | B1 | | 8/2001 | Jonsson |
| 6,345,288 | B1 | | 2/2002 | Reed |
| 6,351,656 | B1 | | 2/2002 | Burgan |
| 6,373,817 | B1 | | 4/2002 | Kung |
| 6,424,711 | B1 | | 7/2002 | Bayless |
| 6,751,297 | B2 | | 6/2004 | Nelkenbaum |
| 6,754,181 | B1 | | 6/2004 | Elliott |
| 6,920,486 | B2 | | 7/2005 | Kiiskinen |
| 6,983,370 | B2 | * | 1/2006 | Eaton et al. ................ 713/182 |
| 2003/0120593 | A1 | * | 6/2003 | Bansal et al. ............... 705/39 |
| 2004/0248600 | A1 | | 12/2004 | Kim |
| 2005/0041647 | A1 | | 2/2005 | Stinnie |
| 2005/0068980 | A1 | | 3/2005 | Mathew |
| 2005/0272413 | A1 | * | 12/2005 | Bourne ..................... 455/415 |
| 2006/0141982 | A1 | | 6/2006 | Timmins |
| 2007/0003045 | A1 | * | 1/2007 | Florkey et al. .......... 379/215.01 |

(Continued)

OTHER PUBLICATIONS

PCT International Search Report, International Application No. PCT/US2006/033181, Apr. 25, 2007.

(Continued)

*Primary Examiner* — Rasha S Al Aubaidi
(74) *Attorney, Agent, or Firm* — Tucker Ellis & West LLP

(57) ABSTRACT

A conversation-based user interface (UI) is described. The presenting of the UI includes receiving communications from numerous people. The communications include media that is electronic. A conversation list is generated that includes conversation information of each of the communications. The conversation information includes information of a sender and the media of each communication. The conversation list is displayed.

30 Claims, 15 Drawing Sheets

U.S. PATENT DOCUMENTS

2007/0022058 A1    1/2007    Labrou

OTHER PUBLICATIONS

Written opinion of the International Searching Authority for Application No. PCT/US2006/033181.

PCT International Search Report, International Application No. PCT/US2006/033071, Apr. 20, 2007.
PCT International Search Report, International Application No. PCT/US2007/000487, Oct. 18, 2007.
PCT International Search Report, International Application No. PCT/US2007/007064, Jun. 30, 2008.

* cited by examiner

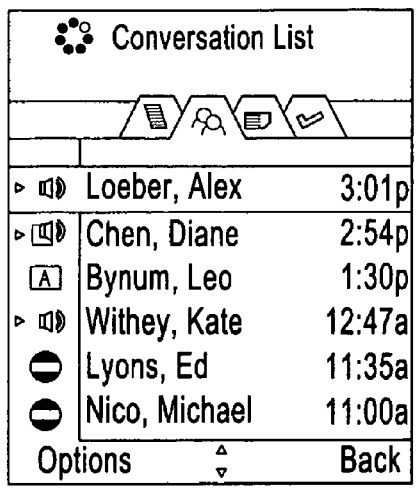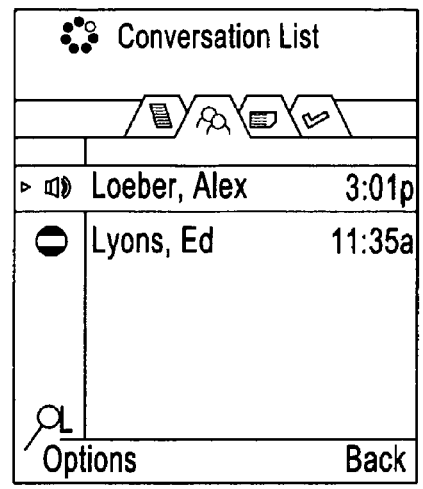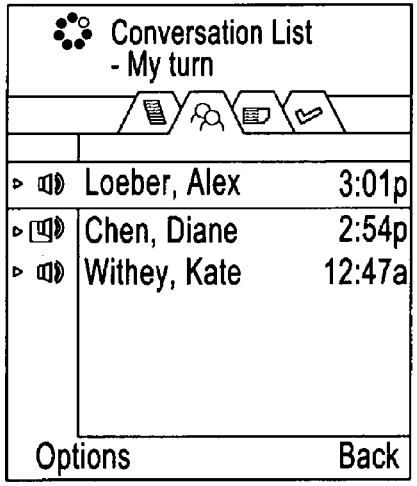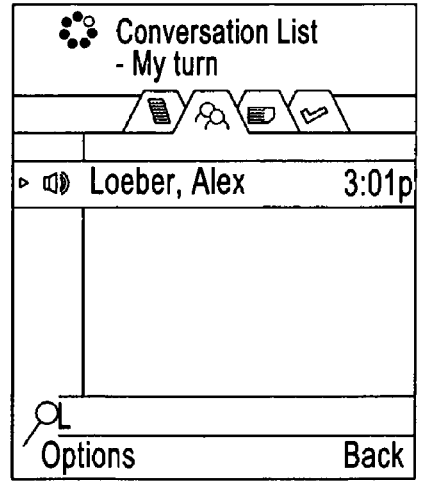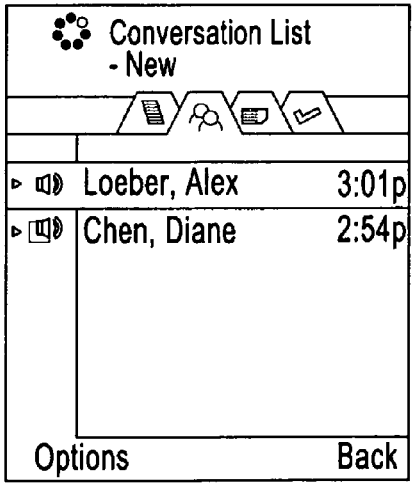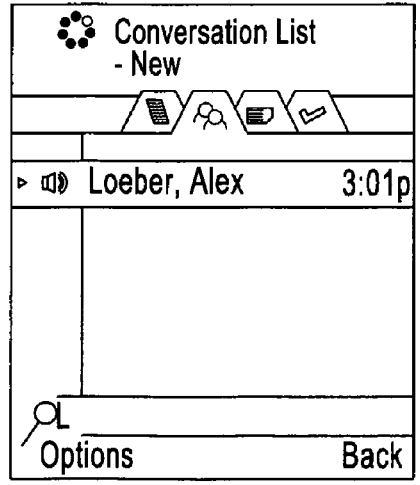
FIG.5

FIG.6

| | Conversation With | |
|---|---|---|
| ✓ | 1:59a Chen, Diane | |
| ▷—❀ | Re: Proposal | 2:54p |
| —❀ | Active Call | 2:35p |
| ✗—❀ | Re: Potential... | 2:20p |
| —❀ | Re: Luch | 10:00a |

Options     Back

FIG.7

Conversation Detail

▁ 2:05a

With: ? User7, Test7
Priority: Normal
Expires: 3:02a today

📱 You called this person
↑ 2:46a today
—◉ Received call request
↓ 12:02a today
<No subject>

Options     Back

800

| Event | Icon | Text if Incoming | Text if Outgoing |
|---|---|---|---|
| Active call | —❋ | Received call request | Sent call request |
| Accept now | | Request accepted | You accepted |
| Accept later | | Request delayed | You delayed until |
| Active text | | Received message | Sent message |
| Text response | | Response | You responded |
| Dialed | | n/a | You called this person |
| *Received call* | | *Received call* | n/a |
| *Missed call* | | *Missed call* | n/a |

| Status Modifier | Icon Modifier | Applies To |
|---|---|---|
| Message in Transit | | Active call, accept now, accept later, active text, text response |
| Transmission has failed | | Active call, accept now, accept later, active text, text response |
| Event Expired | | Active call, active text |

FIG.9

CONVERSATION-BASED USER INTERFACE

RELATED APPLICATIONS

This application is a continuation-in-part (CIP) application of U.S. patent application Ser. No. 10/890,922, filed Jul. 14, 2004, which claims the benefit of U.S. Patent Application No. 60/487,143, filed Jul. 14, 2003.

This application claims the benefit of U.S. Patent Application No. 60/710,998, filed Aug. 23, 2005.

This application claims the benefit of U.S. Patent Application No. 60/711,051, filed Aug. 23, 2005.

This application claims the benefit of U.S. Patent Application No. 60/711,053, filed Aug. 23, 2005.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

FIG. 5 shows Conversation List screens of the conversation-based UI, under an embodiment.

FIG. 6 shows a Per-Person Conversation Screen (PPCS) of the conversation-based UI, under an embodiment.

FIG. 7 shows a Conversation Details Screen (CDS) of the conversation-based UI, under an embodiment.

FIG. 8 is a table of information represented in the event header line of the CDS, under an embodiment.

FIG. 9 is a table of status modifiers of the CDS and their applicability, under an embodiment.

DETAILED DESCRIPTION

A conversation-based user interface (UI) is described. The presenting of the UI includes receiving communications from numerous people. The communications include media that is electronic. A conversation list is generated that includes conversation information of each of the communications. The conversation information includes information of a sender and the media of each communication. The conversation list is displayed.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

A communication system is provided herein that uses client-server architectures to improve the efficiency of multiple types of communications. The communication system, referred to herein as the active mobile collaboration (AMC) system, includes a facilitator. The facilitator of an embodiment is an application hosted on one or more servers or other processor-based devices, and communicates a portable or mobile communications device via one or more couplings. The facilitator communicates with the AMC client of a host portable device via a network coupling for example. The facilitator of alternative embodiments can be distributed among one or more portable processor-based devices including the same communication devices as the client application.

The AMC system also includes a client. The client, also referred to as the AMC client, is a component application of a variety of processor-based mobile communication devices and telephones. The components of the AMC system function to improve efficiency of communications by allowing communication device users to increase accessibility of enterprise and personal contact information from mobile phones and other personal digital assistants (PDAs), dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

Figure 1:
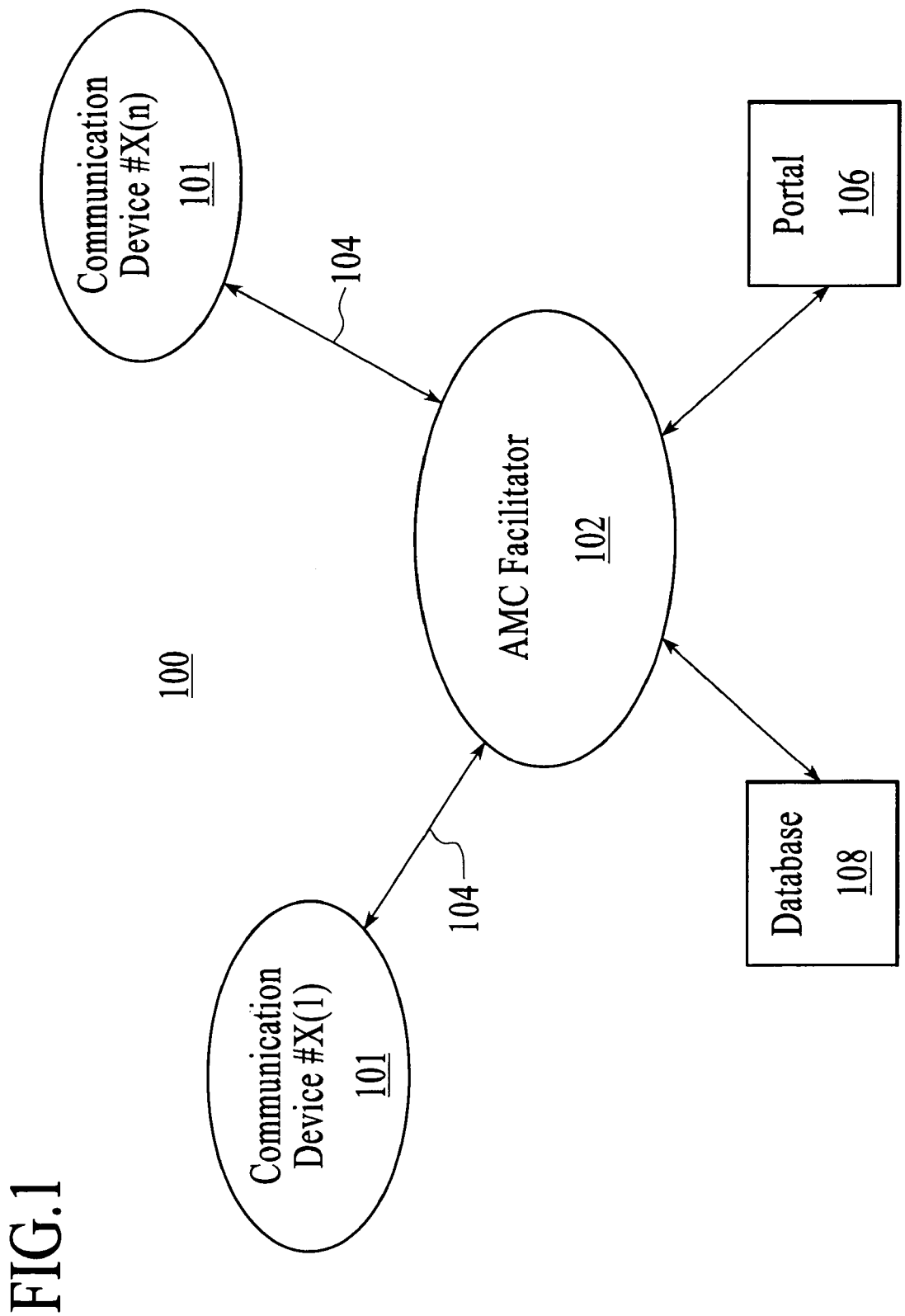
FIG. 1 is a block diagram of an active mobile collaboration (AMC) system, under an embodiment.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers, portable computing devices, portable telephones, portable communication devices, subscriber devices or units, PDAs, devices, wireless devices, wireline devices, voice over Internet Protocol (VoIP) devices, private branch exchange (PBX) devices, clients, soft clients, and desktop clients to name a few. The communication devices 101, also referred to as handsets, client devices, devices, mobile communication devices, and portable communication devices, can include all such devices and equivalents, and are not limited to the communication devices described above.

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet.

Figure 2:
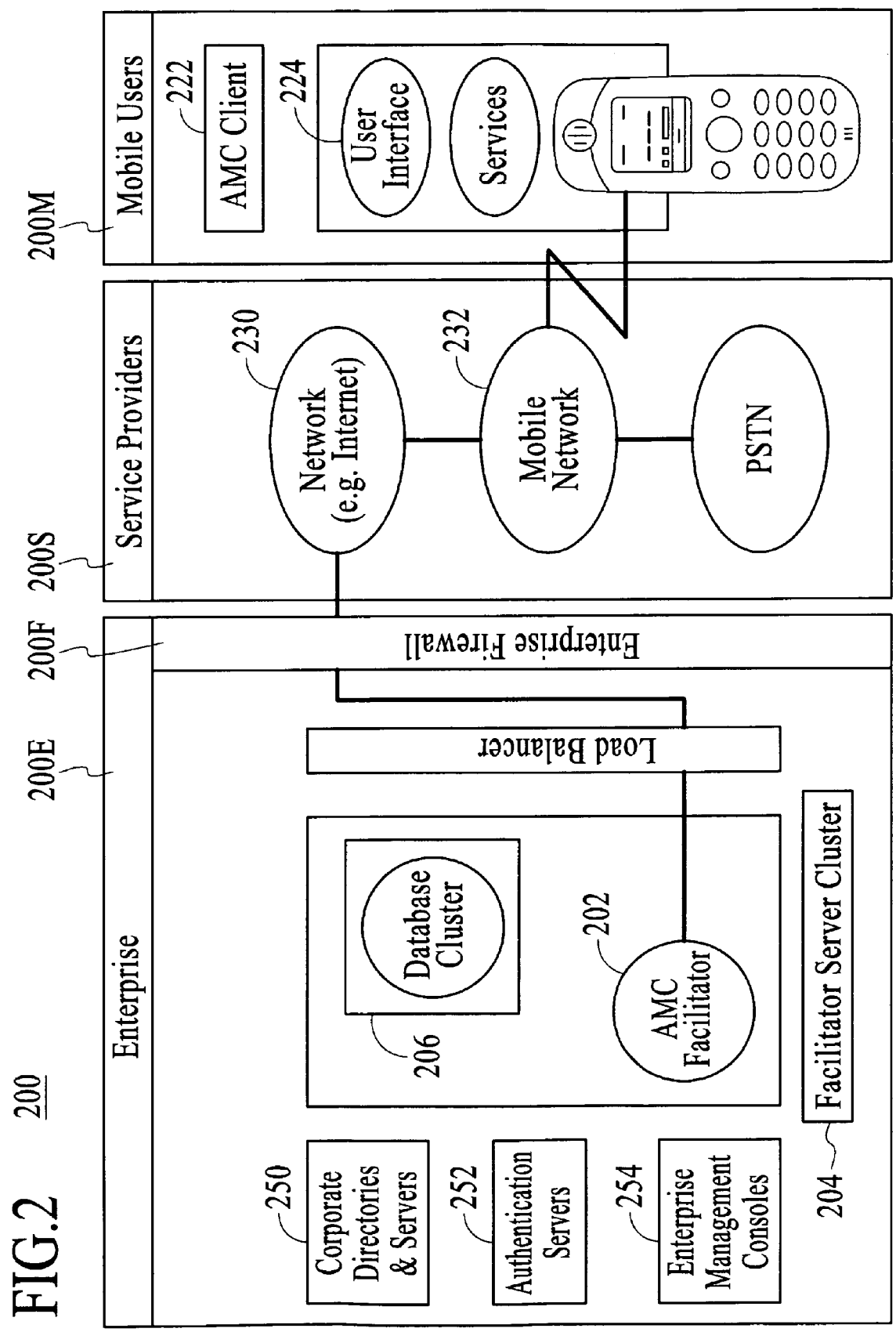
FIG. 2 is a block diagram of a communications system that includes an AMC system, under an alternative embodiment.

FIG. 2 is a block diagram of a communications system 200 that includes an AMC system, under an alternative embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a device of one or more users via one or more network couplings. As an example, the facilitator 202 couples to devices using one or more service provider networks 200S. In this example, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes contact information, directory information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular devices, and leverages the latest application development environments including Symbian OS, Java and BREW to name a few).

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the device native phonebook, and provide data coupling between those sources and devices hosting the AMC client. This contact information is managed by providing the user with access via the device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook, as described in detail below.

Figure 3:
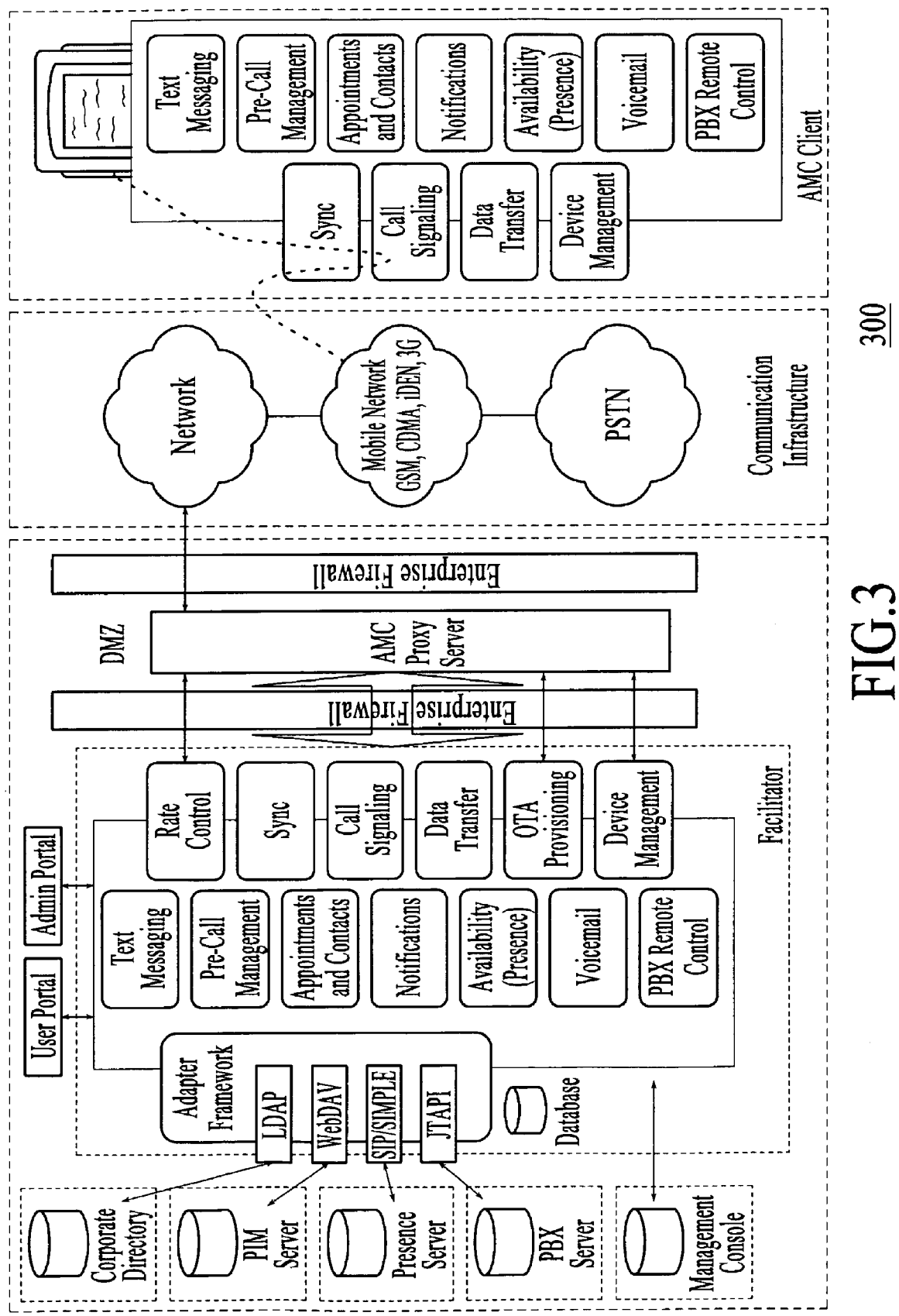
FIG. 3 is a block diagram of a communications system that includes an AMC system, under another alternative embodiment.

FIG. 3 is a block diagram of a communications system 300 that includes an AMC system, under another alternative embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, and management console.

The AMC system includes a facilitator as described herein. The facilitator includes an adapter or adapter framework by which the facilitator simultaneously integrates with components of the enterprise and enterprise servers. The facilitator uses an adapter for each directory server to which it integrates. The adapter of an embodiment is a protocol-specific adapter for each directory server to which it integrates; alternatively, the adapter includes vendor-specific adapters. The facilitator integrates with multiple directories simultaneously, including Lightweight Directory Access Protocol (LDAP)/Active Directory, Exchange, Domino, and third-party instant message (IM)/presence server buddy-lists. The AMC adapters convert the data from the enterprise directories (e.g. external) into a common data structure. The converted data is coalesced together into a single directory presented to the user on device via the client. The single directory generated from the data of multiple directories is referred to as the AMC phonebook.

The facilitator includes one or more applications that support multiple functions provided by the AMC system. The AMC system functions include, but are not limited to, test messaging, pre-call management, appointments and contacts, notifications, availability (presence), voicemail, and PBX remote control.

The facilitator couples to a device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the devices, provides a coupling to individual devices.

Communications between the facilitator and the device are controlled by the facilitator using one or more components and applications. The functions provided by the facilitator in controlling communications include one or more of rate control, synchronization (sync), call signaling, data transfer, OTA provisioning, and device management to name a few. Optionally, the communications path between the facilitator and the communications network includes an AMC proxy server.

The AMC system components of an embodiment include a user interface (UI) for use in accessing functions of the AMC system, as described above. The UI of an embodiment is a component of an AMC client embodiment that includes multiple display screens on a mobile device, but the AMC client is not limited to mobile devices. The UI includes screens that are conversation-based displays of information. The conversation-based screens organize or present messages chronologically by person instead of using a pure chronological order. The messages of each person with whom a user of the host client device is communicating are therefore organized chronologically under a heading of that person, and the person with whom a user has most recently communicated is listed first or at the top of the list. The conversations are organized and presented in a single view regardless of conversation type (e.g. voicemail, phone calls, call requests, email, text messages, SMS, etc.). The AMC client UI thus uses a threaded presentation approach that presents a view combining people and time chronology in a single presentation.

Figure 4:
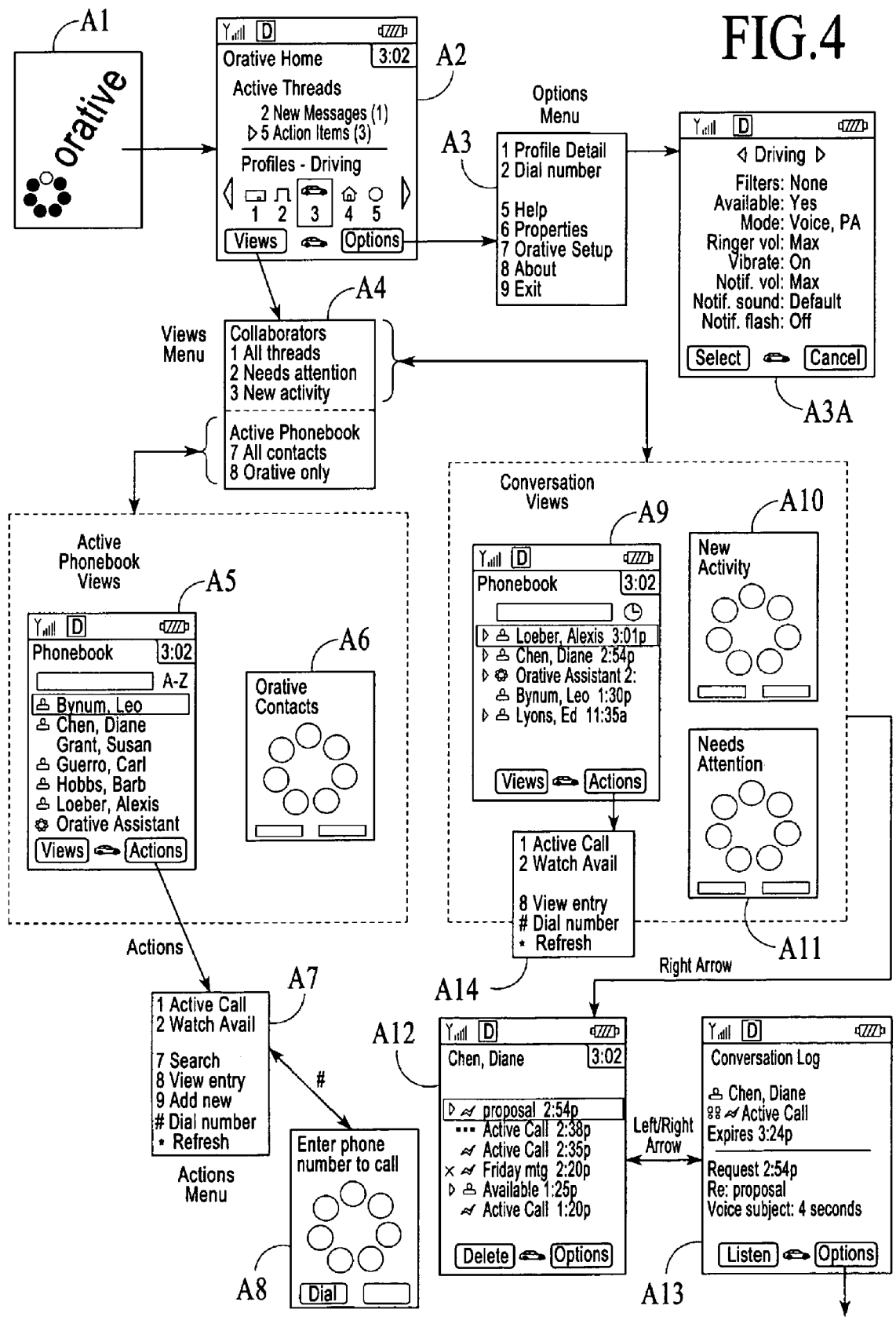
FIG. 4 is an overview of a user interface (UI) hierarchy of the AMC system, under an embodiment.

FIG. 4 is an overview of a user interface (UI) hierarchy of the AMC system, under an embodiment. Each of the blocks shown indicates a presentation by the AMC system on a mobile device screen or display, such as a cellular telephone handset screen. For convenience, each of the blocks will be referred to as a screen or a menu, as appropriate.

Screen A1 is a splash welcome screen, and is the first screen a user sees when starting the AMC client according to the embodiment. The splash welcome screen is shown for a brief time period and displays basic information about the AMC client, such as the version or build number, and copyright information.

Screen A2 is a home screen. Screen A2 is thus the main screen, or home base, for the AMC client. Screen A2 provides summary information about the user's conversations, and notifies the user about new conversation requests from other users. It provides the means to quickly select an availability profile setting. Handset profiles determine handset behavior when calls and alerts arrive. Profiles also specify a user's availability state, which is communicated to other users through their respective Active Phonebook views.

A detailed list of the availability profile attributes for the currently selected profile (on screen A2) is accessible from the Options menu that is shown as screen A3. The home screen A2 further provides an entry point to the other screens in the AMC client, such as Active Phonebook views (screens A5, A6, A7 and A8), Collaboration views (screens A9, A10, A11, A12 and A13), and Settings screens. These various screens are described in detail herein and in the Related Applications.

The home screen A2 includes conversation summary information, showing active threads, such as new messages and action items. The home screen A2 also shows a Profile selector that, in the mode shown, displays icons to represent available Profiles. The home screen A2 also shows an Active Profile indicator showing the currently selected Profile. The home screen A2 also shows Views and Options buttons which will be described further below.

The conversation summary region displays a count of the new, unread conversations received by the user including: New Active call requests; Reminder message for postponement period complete; and Result of Watch Availability requests.

The conversation summary region also displays: a count of the new, unread conversations received by the user (as defined above) that are above 'normal' priority, displayed in red font color; a count of the conversations in which it is the user's turn to respond; and a count of the conversations in which it is the user's turn to respond (as defined above) that are above 'normal' priority, displayed in red font color.

The conversation summary data is updated whenever new messages are received by the AMC client that impact the summary values displayed.

Screens of an embodiment include a graphical indication of the currently selected availability profile using the icon associated with the profile. The Profile Detail screen A3A shows the attribute values for the selected Handset Availability Profile. Using the left and right arrow keys the user can easily scroll through the list of profiles, and select or activate the displayed profile using the left soft key. This selection method is an alternative to the profile selection mechanism on the home screen. When a new profile is selected, the following occurs in an embodiment, for example: a facilitator is notified of the newly selected profile; the user's availability watchers (via Active Phonebooks) are notified of a new availability state; Active profile indicators are updated on all screens that include it, to match the currently selected profile; and Availability profile detail text/graphics are updated to reflect the selected profile.

The Active Phonebook is used to store contact information and initiate mobile phone calls using enhancements of the AMC client. The handset client application builds on includes contextual cues in the Active Phonebook display that give an indication of each user's willingness and ability to communicate. Within the community of users, a user's willingness and ability to received communication corresponds to their currently selected Handset Availability Profile. Because human behavior and network responsiveness are not 100% reliable, the availability cues may become stale over time. When the cues become stale, a clock symbol is overlaid on the regular availability icons. Non-user contacts do not have an icon next to them.

The Active Phonebook listing consists of contact entries, where each entry defines multiple phone numbers. Users are responsible for providing the phone numbers, but AMC system administration incorporates the phone numbers already defined in the handset's native phonebook when possible. The user designates one number per entry as the default for use with the dialing features supplied with the AMC client. For example, when an entry is selected on the Active Phonebook screen and the user presses send, the entry's default number is dialed. In addition to initiating mobile phone calls, the Active Phonebook allows users to initiate the various AMC client calling features such as Active Call. The Active Phonebook always has at least one entry called the "AMC Assistant", which the AMC system uses to communicate important messages and other information to the user.

Each entry provides storage for one to seven phone numbers in one embodiment. Alternative embodiments can provide any number of numbers per entry.

Each phone number in the contact entry is labeled from the following set, which is not meant to be exclusive: Phone number—Mobile 1; Phone number—Mobile 2; Phone number—Office 1; Phone number—Office 2; Phone number—Home 1; Phone number—Home 2; and Phone number—Miscellaneous.

The user selects which label during the "add new" contact process. Associated with each contact entry number label is an icon for use on a Phonebook Entry Detail screen (not shown).

The following contact list filters and sort orders are supported, and can be selected from the 'views' menu of the Active Phonebook screen A5: (i) all contacts on the handset, sorted in ascending alphabetic order, names beginning with 'a' at the top; (ii) user contacts only, sorted in ascending alphabetic order, names beginning with 'a' at the top; and (iii) sort contact entries in order of most frequently called (at the top), least frequently called at the bottom; frequency count means total number of calls placed to any phone number associated with a contact entry; in case of a tie between one or more contact entries, sort the tied entries in ascending alphabetical order. All other phonebook behavior is the same regardless of the filter selected.

Another navigation feature is fast lookup using entry of alphabetic search criteria. For example, in one embodiment, alphabetic search criteria are entered (via Multi-tap or various other input/output devices and/or applications) corresponding to the first three letters of the contact name field; searches using one, two, or three characters are supported. No more than three search characters are supported in one embodiment. As each search character is entered, the contact list is filtered such that only those contact entries with the leftmost characters matching the search criteria appear in the list; the selection bar is positioned over the first contact in the filtered list. For example, if the "5" key is pressed, the contact list is reduced to only those entries that begin with the letter "J", and the selection bar is positioned over the first entry beginning with the letter "J"; if "5" is pressed twice in rapid succession, the list is reduced to entries starting with the letter "K" and the selection bar is positioned over the first entry beginning with the letter "K. A short pause between key presses indicates letter entry for the next position in the search criteria. For example, the key presses "J"-short pause-"K" would reduce the list to entries that begin with "Jk". If no entries match the search criteria then nothing will be displayed.

A Views menu A4 allows the user to change views. The Views menu A4 is used to navigate to either alternate views of the Active Phonebook, or alternate views of the Collaboration, or Conversation screens.

An Actions menu A7 allows the user to initiate an action against one or more contacts or groups in the Active Phonebook (eg. Active Call), and manage phonebook entries including viewing, editing or adding new entries, and initiating a directory search.

One embodiment includes the following menu item preconditions: (i) Menu item number 1 (Active call), requires the user to select one or more contacts (or groups) first; (ii) Menu item number 2 (Watch availability), requires the user to select one or more user contacts (or groups) first; and (iii) Menu item number 8 (View entry), requires the user to select one and only one contact (or group) first.

The user selection is irrelevant for all other menu items. In one embodiment, Active Call request may be initiated against both user and non-user contacts, whereas Watch Availability request may only be initiated against user contacts.

The UI hierarchy of an embodiment includes a series of collaboration or Conversation screens (such as screen A9) to allow users to monitor and manage all the conversations they engage in with the people in their phonebook. A "conversation" as referred to herein includes all forms of textual and verbal communication media, including but not limited to Active Calls, voice messaging, text messaging, and conference calling, but can include other conversation and/or messaging formats. The AMC client helps users keep track of all the conversations they are engaged in and provides convenient reminders and alerts when it is their turn to respond.

A Conversation screen A9 (also referred to as Conversation List screen) functions similarly to the Active Phonebook described above (e.g., name search, action invocation). However the view of the phonebook of an embodiment shows people with whom the user is currently engaged in conversation. Different filters are available for the Conversation screen A9 to further refine the list contents. The combination of icons, font style, and font color convey state information about the people and conversations. For example, bold font indicates a new correspondence has been received from the named person, and red text indicates one of high priority has been received. An availability state icon is displayed next to each user contact in a similar manner to the Active Phonebook views, or screens. In addition, an indicator is displayed next to each contact when the end user's attention is required. There is a visual cue indicating the named person is trying to contact the user and allowing further exploration to determine the urgency and purpose of the correspondence. A Conversations screen for each person provides the detailed information about each of the conversations the user is engaged in with the person. In most respects, the contacts shown on this display provide similar functionality as the Active Phonebook; the differences have to do with how the lists of contacts are displayed, the contents of the menus, and key mappings.

In one embodiment, the following contact list filters are supported: (i) contacts with which the user has at least one conversation in progress (e.g. Active Call, Voice message, text message, watch availability); in this case the screen title is "All Conversations" or "Conversation List"; (ii) contacts with which the user has at least one conversation in progress, and it is the user's turn to act (e.g. receipt of an Active Call request, or delayed call reminder); in this case the screen title is "My Turn to Act" or "Conversation List—My Turn"; the attention icon can appear in the left most column, next to each contact; and (iii) contacts with which the user has at least one conversation in progress and new activity has occurred, and the new activity has not been read (e.g., receipt of an Active Call request, or response); in this case the screen title is "New Activity" or "Conversation List—New"; each contact name in this list can be displayed with bold font style. Contacts can be sorted in chronological order where the contact with the most recent activity appears at the top of the list, regardless of which filter is used.

A Conversations Action menu A14 allows the user to initiate an action against one or more contacts or groups in the Collaboration view (e.g. Active Call), and view phonebook entries.

A Conversation screen A12 (also referred to as a Per-Person Conversation Screen (PPCS)) displays a list of the conversations in progress with a specific individual. The individual's name appears at the top of the screen. The user accesses this view from the Conversations screen A9. Next to each contact name are two columns of icons that give state information about the conversation in progress and the type of conversational media in use. Icons only appear in the left most column when the user's attention is required. Font color indicates priority, where red indicates high priority messages. Bold font indicates a new correspondence has been received, which the user may want to review. Ghosted (e.g. light gray) font indicates the conversation thread has expired and has been designated for automatic cleanup.

The first display column shows one of the following three values (an icon should appear in this column only when the thread requires the attention of the user): an 'attention' icon in cases where it's the user's turn to act on the conversation (eg. user's turn to respond to an Active Call request); a 'failed to deliver' icon in cases where a break down in message traffic has occurred for the thread; and "blank" or no icon for all other cases.

The second display column shows an icon representing the media type of the conversation thread, or the ellipsis icon if the user has initiated a message that is waiting to be sent or in transit to the intended recipient. If a conversation transitions to a different media, this icon changes to reflect the new media. An example is when Active Call request is responded to with a voice message.

A Conversation Log screen A13 (also referred to as a Conversation Details Screen (CDS)) provides detailed information about a single conversation thread. The Conversation Log screen A13 includes a running summary of message exchanges and other conversation activity for the life of the conversation.

The Conversation screens as described above help users monitor and manage all conversations they engage in with the people in their phonebook, where a conversation encompasses all forms of textual and verbal communication media, including Active Calls, voice messaging, text messaging, and conference calling. The conversation-based UI thus helps users keep track of all the conversations they are engaged in and provides convenient reminders and alerts when it is their turn to respond. Each of the Conversation List, PPCS, and CDS of the conversation-based UI are described in detail below using examples of these screens or displays.

FIG. 5 shows Conversation List screens of the conversation-based UI, under an embodiment. The functions (e.g. name search, action invocation) of the Conversation List are similar to those of the Active Phonebook described herein and in the Related Applications. However the Conversation List view of the phonebook shows people with whom the user is currently engaged in conversation. The user has the ability to show the screen with differing filters to further refine the list contents.

The Conversation List screens include multiple filtered conversation lists. The filtered conversation lists include a Conversation List, a Conversation List—My Turn, and a Conversation List—New, which correspond to one or more of an All Conversations filter, a My Turn filter, and a New Messages filter, respectively. The screen title is updated to show which filter is currently applied. Regardless of filtered conversation list being displayed, contacts are sorted in chronological order where the contact with the most recent activity appears at the top of the list.

As an example of the filtered conversation lists, selection of the All Conversations filter results in the display of a Conversation List 502 on the client device screen that includes all conversations in which the user is involved. Selection of the My Turn filter applies this filter to the contents of the Conversation List 502 and results in the display of the Conversation List—My Turn 504. Selection of the New Messages filter applies this filter to the contents of the Conversation List 502 and results in the display of the Conversation List—New 506.

As another example of the filtered conversation lists, selection of the All Conversations filter results in the display of a Conversation List 512 on the client device screen that includes all conversations in which the user is involved. Selection of the My Turn filter applies this filter to the contents of the Conversation List 512 and results in the display of the Conversation List—My Turn 514. Selection of the New Messages filter applies this filter to the contents of the Conversation List 512 and results in the display of the Conversation List—New 516.

The filters used by an embodiment to filter, search and/or sort information support multi-dimensional sorting or filtering. The dimension on which filtering or sorting is based includes, but is not limited to, presence, availability, location, email, phone number, network identification, title, profession company, department, location/facility, region, group affiliation (i.e. information assigned by a system administrator such as West Coast Sales Team, Account Team, Escalation Support Team, etc.), mailing list of which contact is a member, supervisor name, assistant, instant messaging address, children, spouse, notes, category, last active date, and other miscellaneous fields or information.

The combination of icons, font style, and font color of the Conversation List convey state information about the people and conversations. For example, bold font indicates a new correspondence has been received from the named person, and the highlight color text indicates one of high priority has been received. The availability state icon is displayed next to each AMC contact. In addition, an indicator is displayed next to each contact when the user's attention is required. The indicator displayed provides a visual cue indicating the named person is trying to contact the user, and the user should explore further to determine the urgency and purpose of the correspondence. The Conversations view for each person provides the detailed information about each of the conversations the user is engaged in with the particular person.

The Conversation List screen includes tabs in a navigation pane or region that allow the user to quickly access other screens of the UI using the left and right arrow keys, for example. The Conversation List of an embodiment displays a list of contact entries, one per line. Below the list of contact entries is a text entry region for phonebook search characters that appears when a search is being entered. Two columns of icons are displayed to the left of each contact name. The first column of icons displays the attention icon, and the second column of icons displays an AMC availability icon, but the Conversation List is not limited to two columns configured in this manner. The first display column shows or displays the attention icon for people with whom the user has a conversation in which it is the users turn to act or respond. The second display column displays the availability icon for AMC subscribers. If the contact is not an AMC subscriber the second icon field remains empty.

Following the availability icon, the value stored in the contact entry name field is displayed. The contact name is displayed using the [CONTACT_NAME] format but is not so limited. A fourth display column follows the contact entry field and displays the time using the [TIME_OR_DATE] format.

The Conversation List display of an embodiment supports numerous font styles and colors when displaying contact names. Font style and color are combined if the necessary conditions apply. For example, a default font color indicates that none of the conversations in progress for the named contact have a priority higher than 'normal' priority. In another example, highlighted colored font indicates that at least one of the conversations in progress for the named contact has a priority higher than 'normal' priority (e.g. important priority, critical priority, etc.). Further, bold font style indicates that at least one of the conversations in progress for the named contact has new, unread activity (e.g. receipt of a new request or response message). Additionally, regular font style indicates that all of the conversations in progress for the named contact have been read.

The Conversation List display supports selection of a contact using a selection bar overlay. Up/down cursor keys are used to manipulate or control the selection bar through the Conversation List (e.g. one entry at a time). The selection bar wraps around top to bottom, and bottom to top. When the user navigates to the Conversation List screen from another screen, the selection bar is positioned over the first entry in the list. One exception is that if the user navigates from the Phonebook screen, and the contact that had been highlighted is also present in the Conversation List screen, then the selection bar is placed over that contact.

The conversation-based UI includes a per-person conversation screen. FIG. 6 shows a Per-Person Conversation Screen (PPCS) of the conversation-based UI, under an embodiment. The PPCS displays a list of the conversations in progress with a specific individual. The name of the individual to whom the PPCS corresponds appears in the navigation pane. The user accesses this view from the Conversation List screen. Adjacent to each contact name are two columns of icons that give state information about the conversation in progress and the type of conversational media in use. Icons appear in the left-most column when the user's attention is required. Font color indicates priority (e.g. red indicates high priority messages). Bold font indicates a new correspondence has been received, which the user may want to review. Ghosted font (e.g. light gray in color) indicates the conversation thread with this individual has expired and has been designated for automatic cleanup.

The PPCS display includes a list of conversation entries, one per line. Regions of the display are reserved for two columns of icons to the left of each entry. A first column of the PPCS is configured to display one of a number of possible icons or values. The icons that can be displayed include for example an attention icon and a failed to deliver icon. An icon appears in this column when the thread requires the attention of the user. The attention icon is displayed in the first column to indicate it is the user's turn to act on the conversation (e.g. user's turn to respond to an Active Call request). The failed to deliver icon is displayed where a break down in message traffic has occurred for the thread. A blank or no icon can be displayed in the first column.

A second column of the PPCS is configured to display an icon representing the media type of the conversation thread. Alternatively, the ellipsis icon can be displayed in the second column when the user has initiated a message that is waiting to be sent or in transit to the intended recipient.

Following the two icon columns, a subject is displayed of the last message received for the thread; if the last received message is without a subject, the name of the conversational media is displayed instead of the subject. The third display column, which includes the subject, displays the first few characters of the message subject or "<No subject>" if none. The text subject displayed is truncated to fit the horizontal screen space available. The time of the last activity for the thread is displayed in the far right region of each entry. A fourth display column follows the subject field and displays the time of the last activity for the thread using the [TIME_OR_DATE] format.

The PPCS display of an embodiment supports numerous font styles and colors when displaying entries. Font style and color are combined if the necessary conditions apply. For example, a default font color indicates that the last designated priority for the conversation in progress was 'normal' priority. In another example, highlighted font indicates that the last designated priority for the conversation in progress has greater than 'normal' priority (e.g. important priority, critical priority, etc.). Further, bold font style indicates that the conversation in progress for the named contact has new, unread activity (e.g. receipt of a new request or response message). Additionally, regular font style indicates that the conversation in progress for the named contact has been read (e.g. does not have new, unread activity). Light font color indicates the conversation has expired, and is in the process of being cleaned up.

The PPCS display supports selection of a list entry using a selection bar overlay. Up/down keys or arrows are used to manipulate or control the selection bar through the list (e.g. one entry at a time). The selection bar wraps around top to bottom, and bottom to top. When the user navigates to the options menu, and then returns to the PPCS screen, the selection bar is positioned over the list entry it was on prior to switching to the menu. When the user navigates to the PPCS screen from another screen, the selection bar is positioned over the first entry in the list. The list of conversation entries of the PPCS display is sorted in chronological order where the thread with the most recent activity (e.g. newest) appears at the top of the list.

The conversation-based UI includes a screen that displays details of conversations in which the user is or has engaged. FIG. 7 shows a Conversation Details Screen (CDS) of the conversation-based UI, under an embodiment. The CDS provides detailed information about a single conversation thread, and includes a summary of message exchanges and other conversation activity for the life of the conversation. The summary or log of message exchanges is arranged with the most recent communication at the top and the oldest at the bottom.

The CDS of an embodiment is divided into three regions but is not so limited. A non-scrolling region extends from the top of the screen down to the dividing line after the "expires" field. A scrolling region is located in the center portion of the screen from the dividing line to just above a bottom portion of the screen. This bottom portion of the screen includes another non-scrolling region for use in displaying soft key labels and scroll direction indicators. The soft key labels include "OPTIONS" and "BACK" soft key labels but are not so limited. The "OPTIONS" soft key label of the CDS is context sensitive to the last (top) log entry, but is not so limited.

The scrolling region includes a history of the events associated with the instant conversation. Each event is represented in the scrolling text area. The events have a consistent header line and have optional text on the lines following the header line. Vertical scroll indicators are displayed if the amount of text in the scrolling area is larger than that which can be displayed on the screen.

Event header lines are configured to convey the event type and the direction of communication represented by the event. FIG. 8 is a table of information represented in the event header line of the CDS, under an embodiment. Some of the events include additional status modifiers that indicate that the message is in transit, the transmission has failed, and/or the event has expired. FIG. 9 is a table of status modifiers of the CDS and their applicability, under an embodiment.

A message direction icon is included on the line immediately following the header line next to the time value. The message direction icon is one of two icons representing message direction, including an icon for each of "incoming" and "outgoing" messages.

For the events associated with the instant conversation, the time value is displayed on the line below the header. Time values shall be displayed with an indication of the date depending on the day. The time component is appended with either "p" or "a" to denote PM or AM respectively. For event times that occurred yesterday, the time display format is a "HH:MMc Yesterday" format. For event times that occur today, the time display format is a "HH:MMc Today" format. For event times that occur tomorrow, a time display format is a "HH:MMc Tomorrow" format. For all other cases, a time display format is a "HH:MMc, MM/DD" format. Below the time value line, the subject of the message is displayed. If the event is "dialed", the subject is not displayed.

Figure 10:
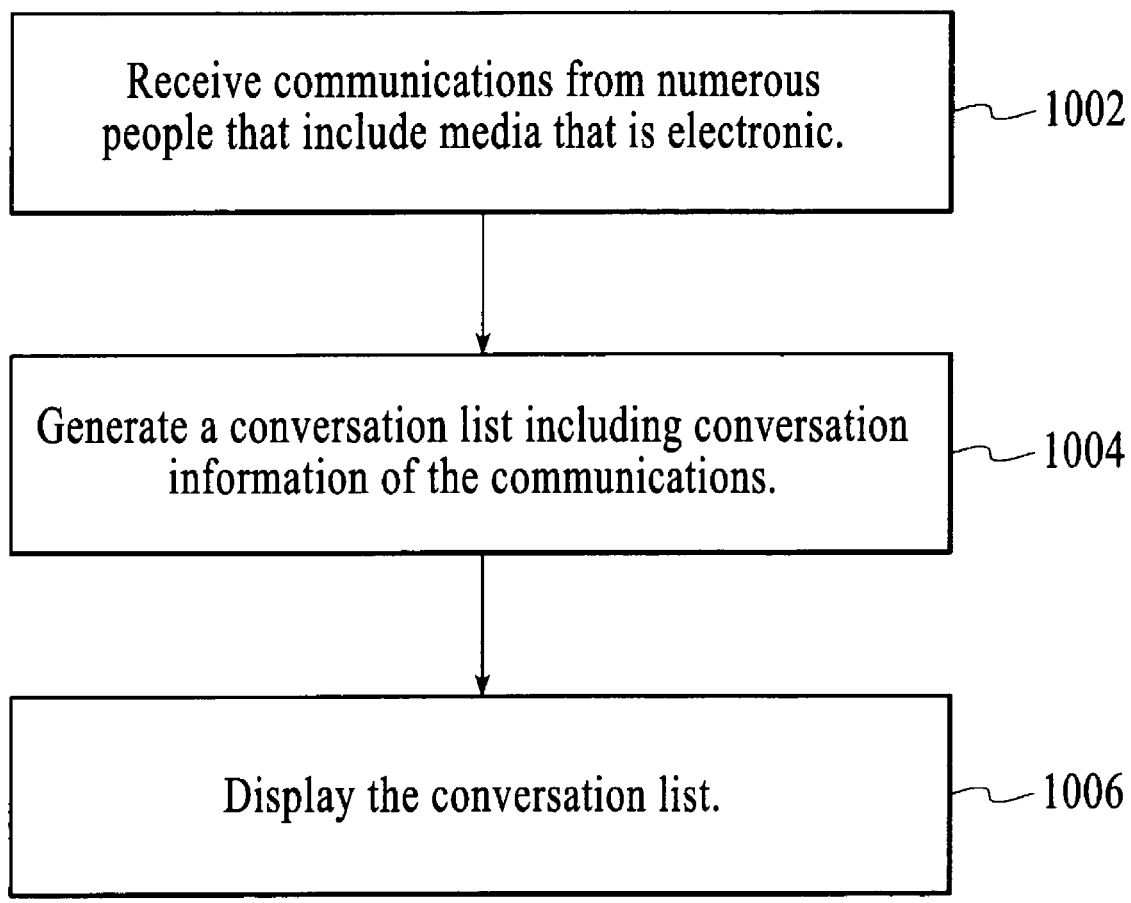
FIG. 10 is a flow diagram for presenting a conversation-based user interface, under an embodiment.

FIG. 10 is a flow diagram for presenting a conversation-based user interface 1000, under an embodiment. The presenting includes receiving 1002 communications from numerous people. The communications include media that is electronic. A conversation list is generated 1004 that includes conversation information of each of the communications. The conversation information includes information of a sender and the media of each communication. The conversation list is then displayed 1006.

Figure 11:
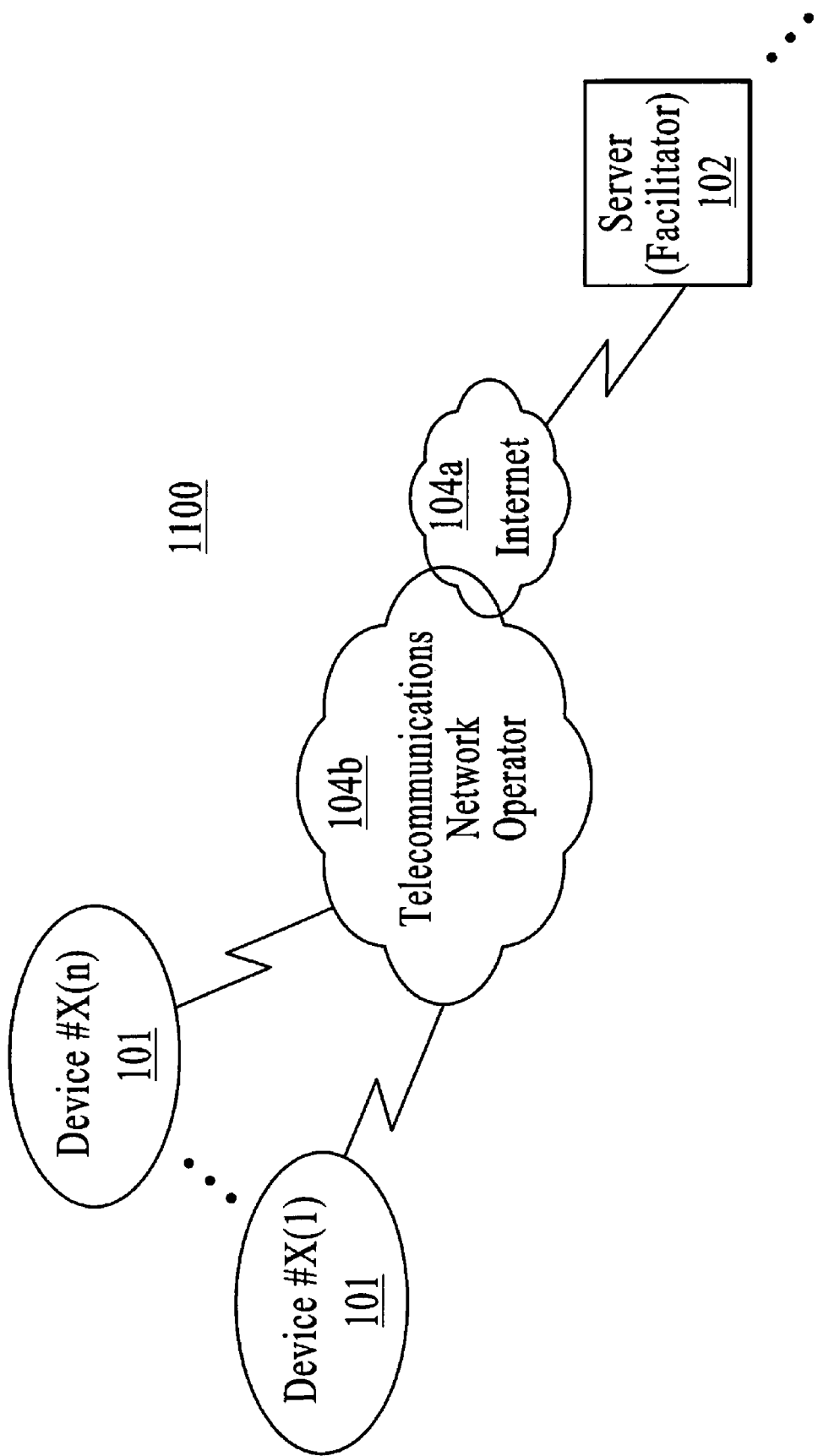
FIG. 11 is a block diagram of an AMC system, under an alternative embodiment.

Some examples follow of alternative AMC system configurations that include the facilitator and client described above. FIG. 11 is a block diagram of an AMC system 1100, under an alternative embodiment. The AMC system 1100 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 12:
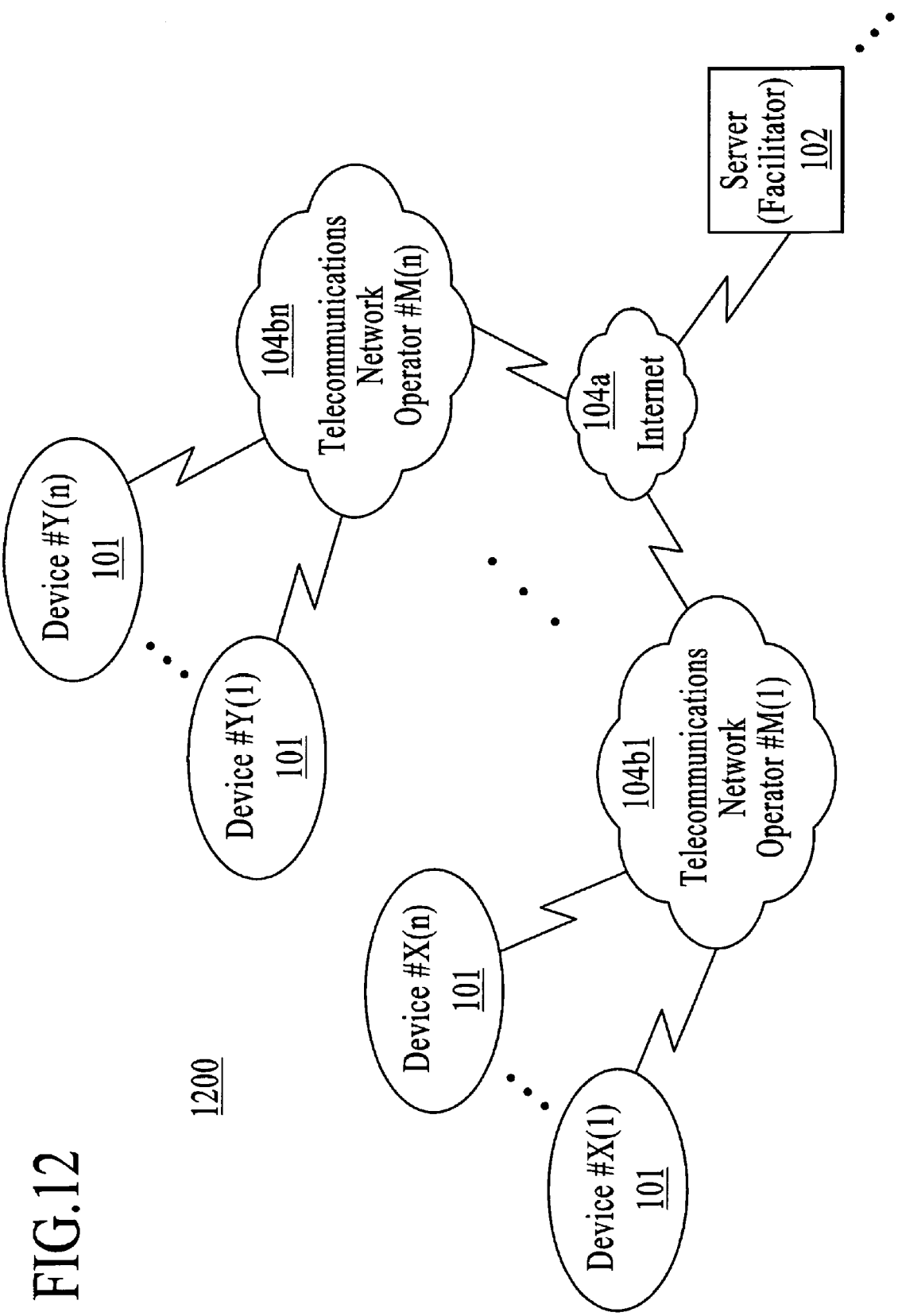
FIG. 12 is a block diagram of an AMC system, under another alternative embodiment.

FIG. 12 is a block diagram of an AMC system 1200, under another alternative embodiment. The AMC system 1200 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above with reference to FIG. 11, but are not so limited.

Figure 13:
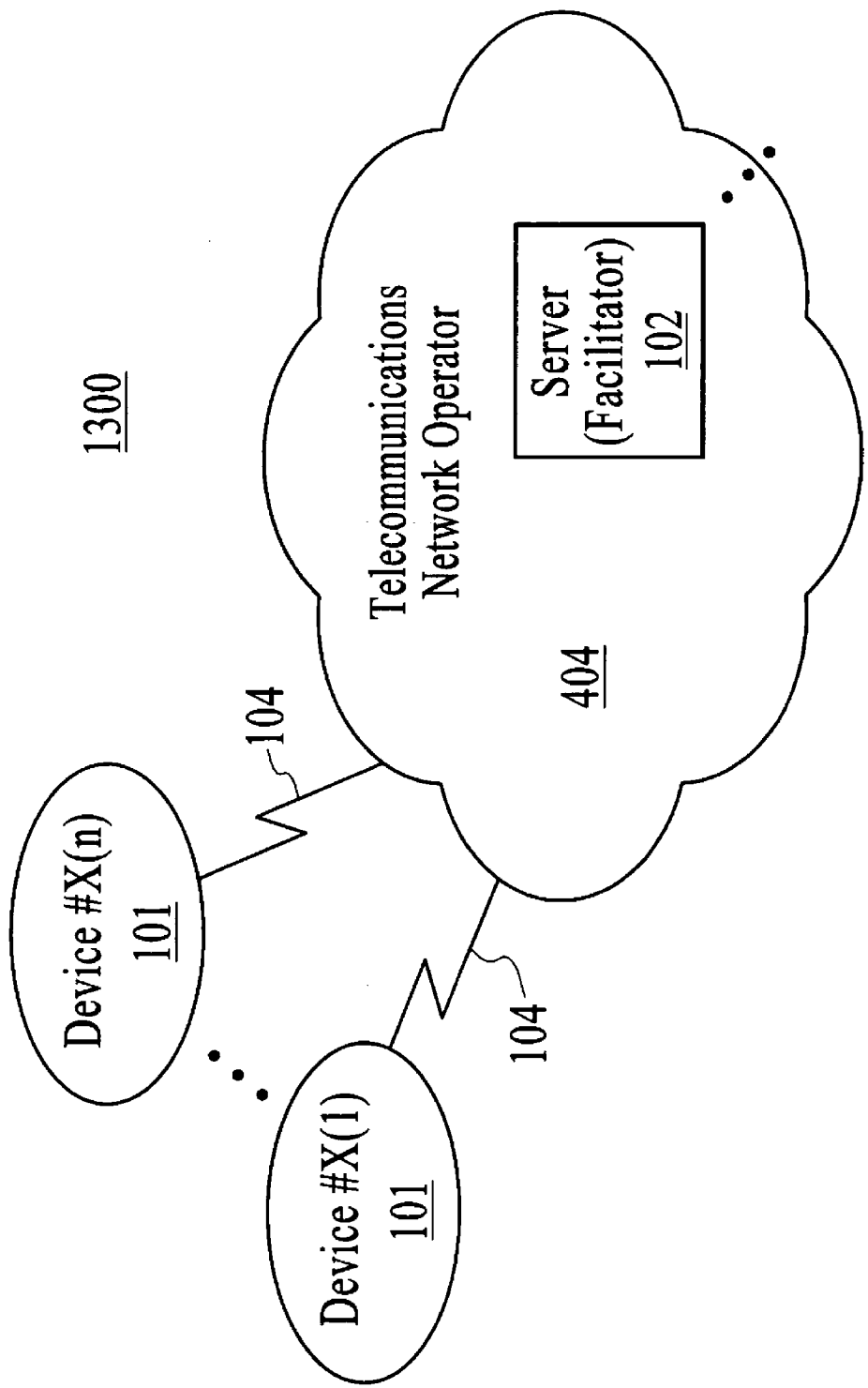
FIG. 13 is a block diagram of an AMC system, under yet another alternative embodiment.

FIG. 13 is a block diagram of an AMC system 1300, under yet another alternative embodiment. The AMC system 1300 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited.

Figure 14:
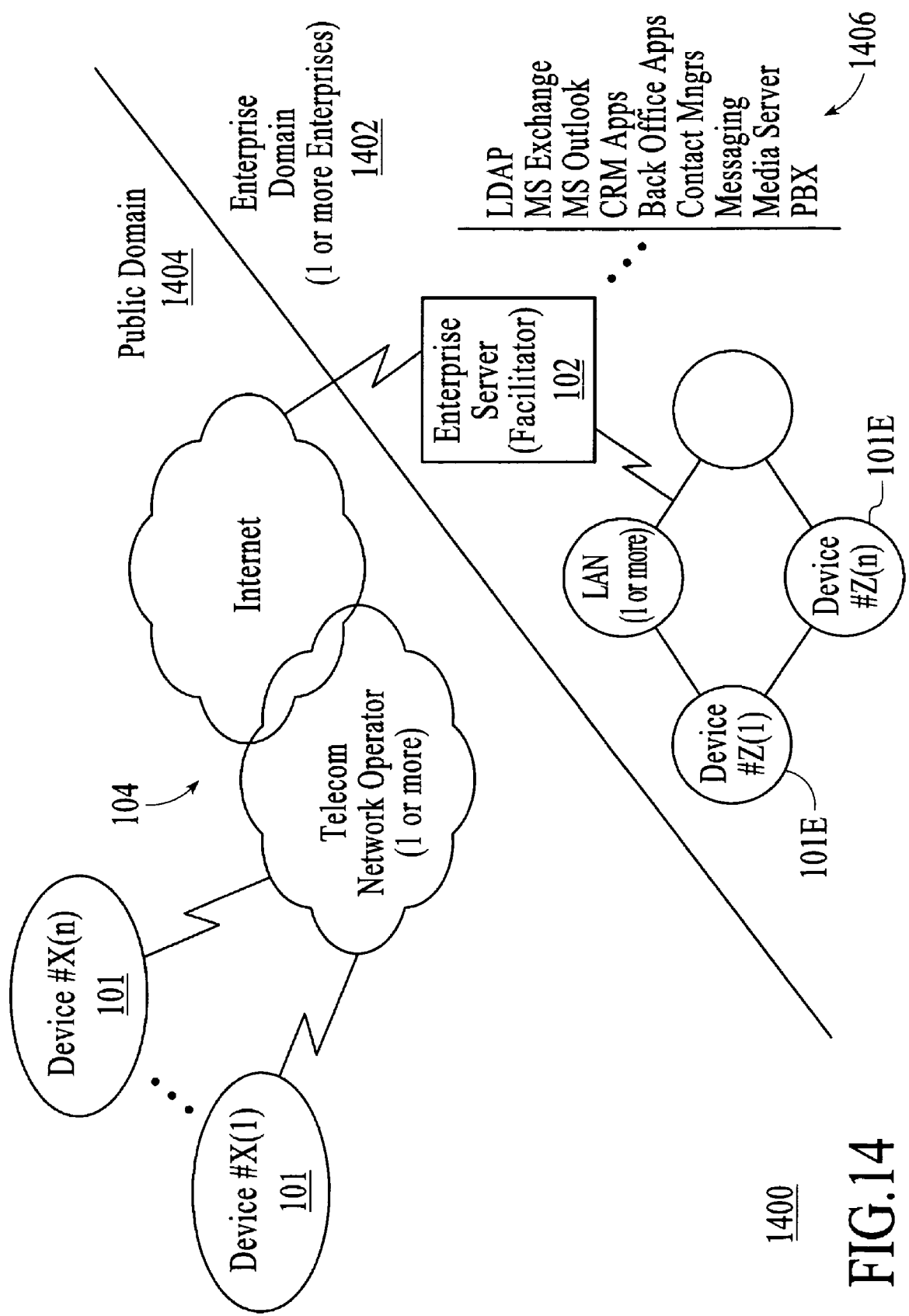
FIG. 14 is a block diagram of an AMC system in an enterprise domain, under another alternative embodiment.

FIG. 14 is a block diagram of an AMC system 1400 in an enterprise domain, under another alternative embodiment. The AMC system 1400 includes a server hosting the facilitator 102 where the server/facilitator 102 is a component of a corporate or enterprise infrastructure 1402. The server can host numerous additional applications 1406 in addition to the facilitator 102 or can be dedicated to the facilitator 102. The facilitator 102 communicates with one or more client devices 101 in the public domain 1404 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 1402 to provide AMC system functions among the client devices 101E as described below. The client devices 101E in the enterprise domain 1402 are shown coupled to one or more LANs, but are not so limited.

Figure 15:
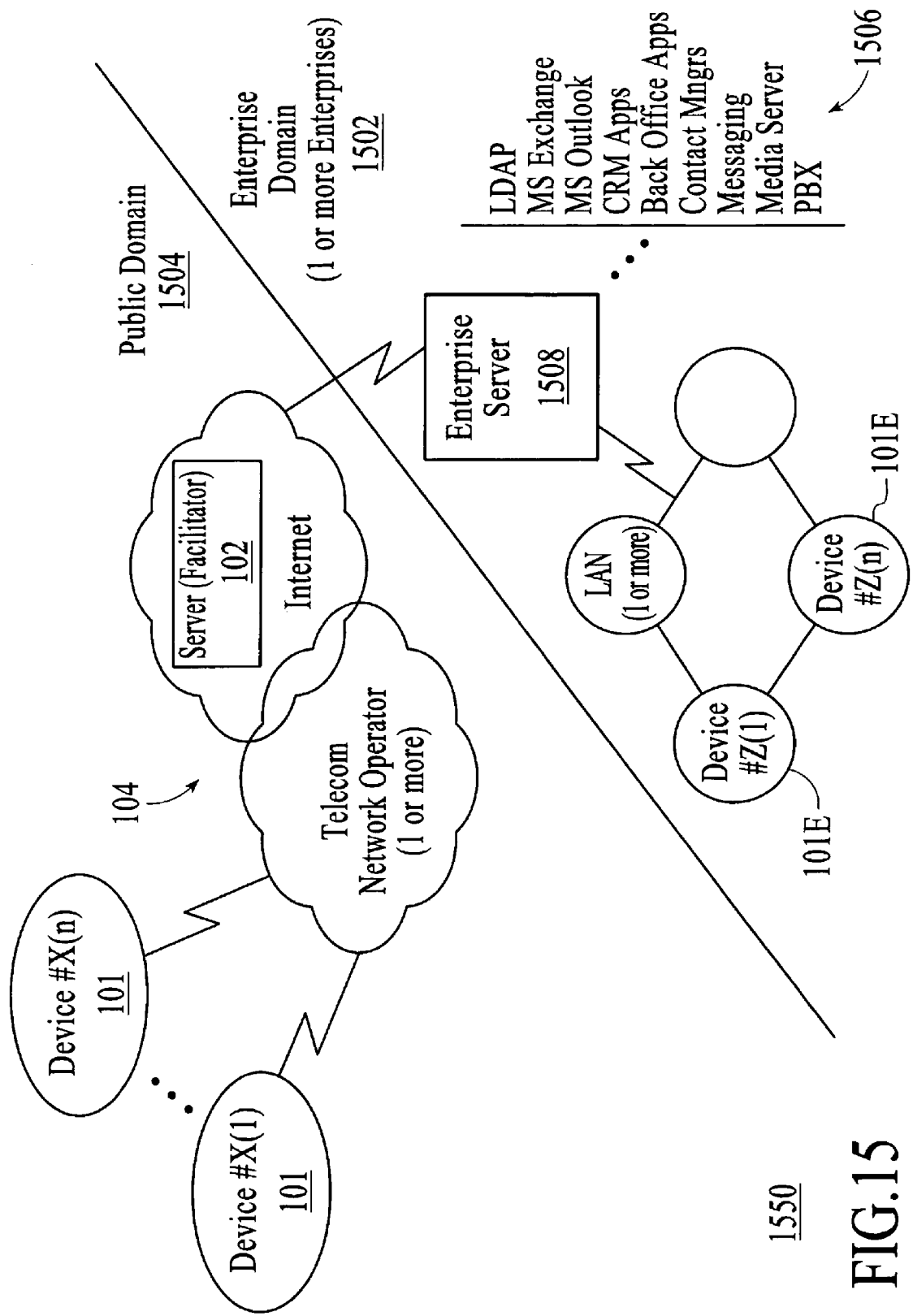
FIG. 15 is a block diagram of an AMC system in a public domain coupled across components of an enterprise domain, under another alternative embodiment.

FIG. 15 is a block diagram of an AMC system 1550 in a public domain coupled across components of an enterprise domain, under another alternative embodiment. The AMC system 1550 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 1504 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 1502 including, for example, one or more client devices 101E, one or more enterprise servers 1508, and one or more LANs. The facilitator 102 provides AMC system functions among the client devices 101E as described below. The client devices 101E in the enterprise domain 1502 are shown coupled to one or more LANs, but are not so limited.

As an alternative to the couplings of this AMC system 1550, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 16:
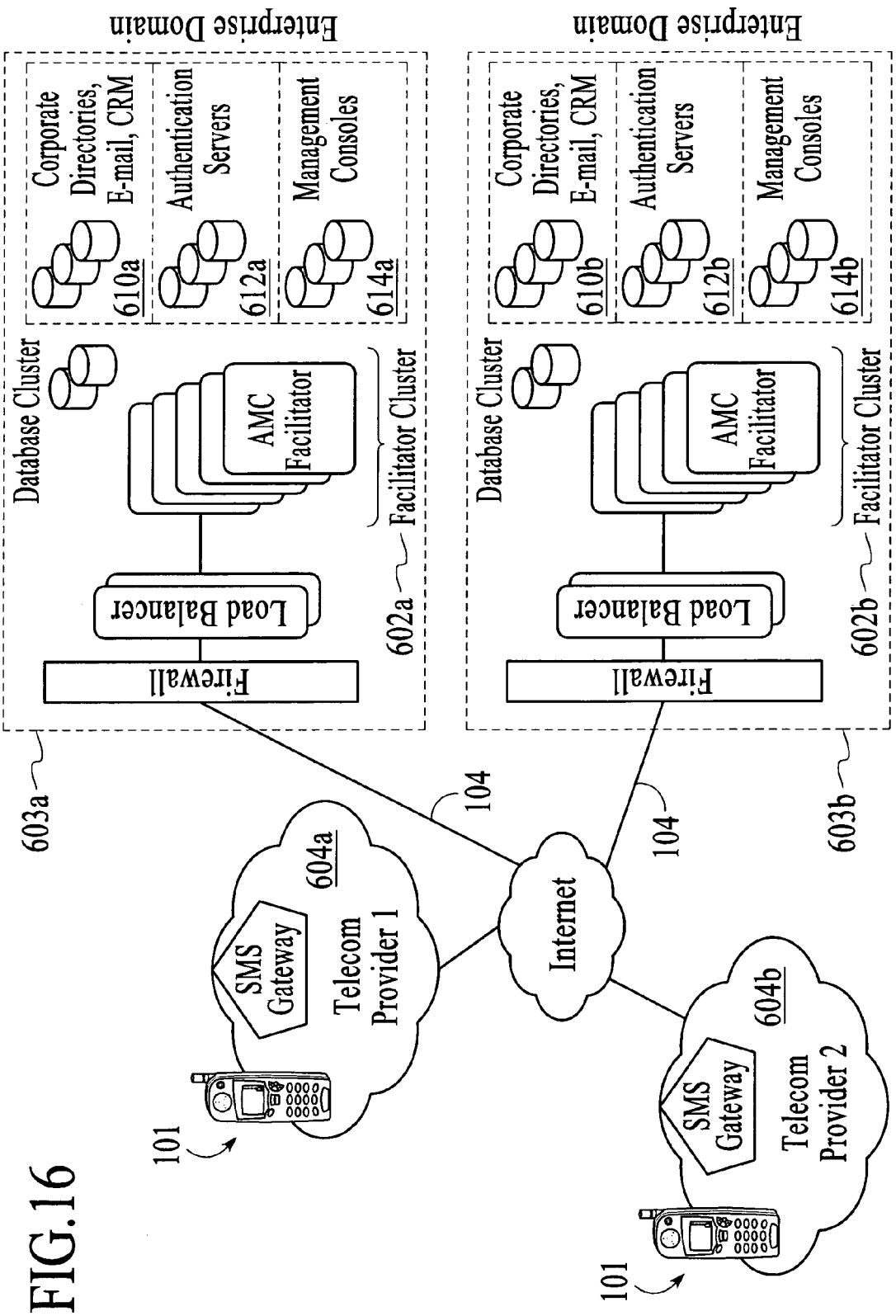
FIG. 16 is a block diagram of an AMC system in an enterprise domain, under still another alternative embodiment.

FIG. 16 is a block diagram of an AMC system 1600 in an enterprise domain, under still another alternative embodiment. The AMC system 1600 includes one or more facilitators that form facilitator clusters 602a and 602b within each of a number of enterprise domains 603a and 603b. Facilitators of the facilitator clusters 602a and 602b communicate with one or more client devices 101 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 17:
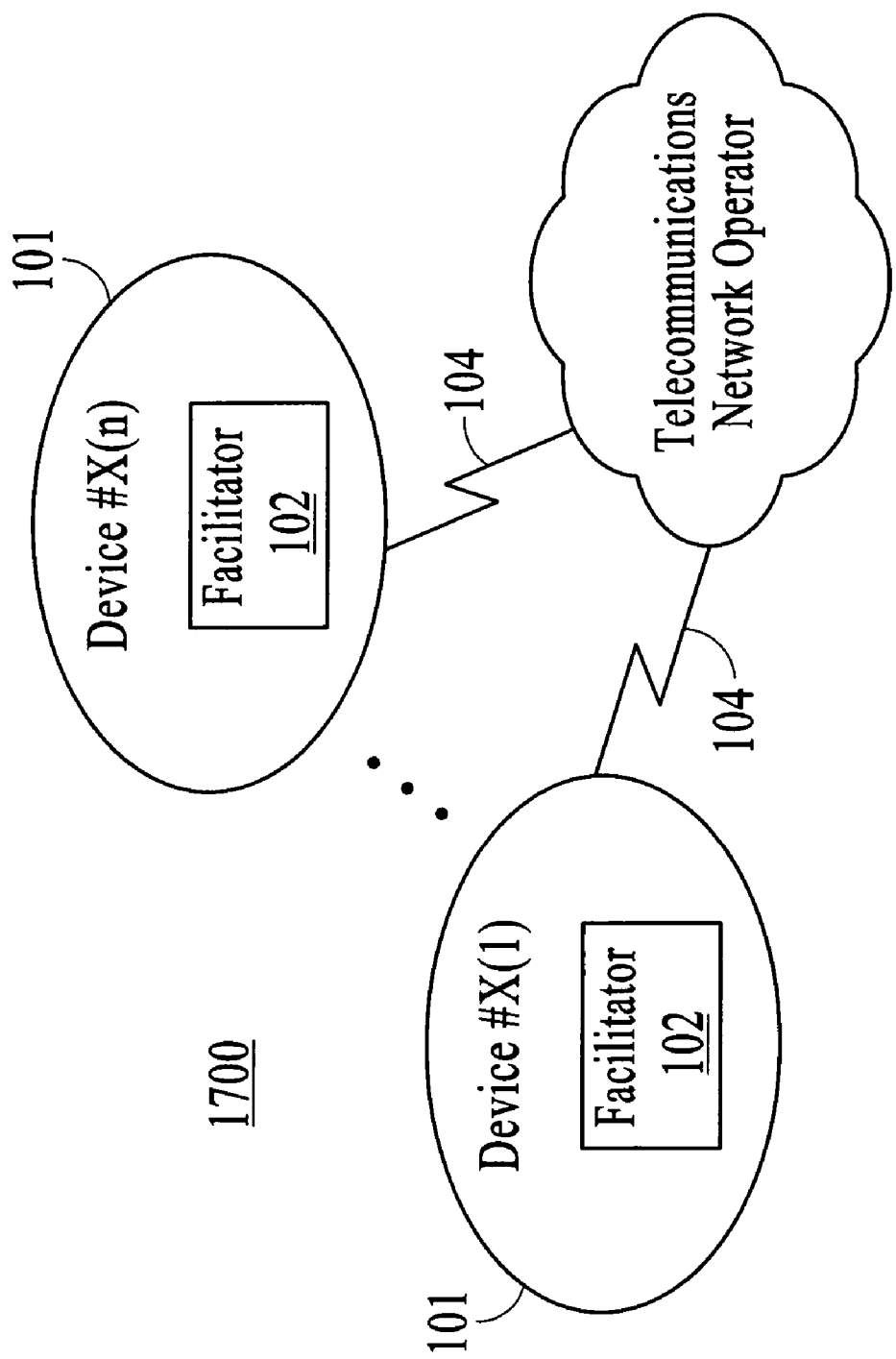
FIG. 17 is a block diagram of an active mobile collaboration (AMC) system, under an embodiment.

FIG. 17 is a block diagram of an active mobile collaboration (AMC) system 1700, under an embodiment. The AMC system 1700 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, software, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems is not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

What is claimed is:

1. A method comprising:
receiving a plurality of communications by a first user device associated with a first user from a plurality of users associated with a plurality of user devices;
generating a conversation list listing the plurality of communications of the first user device with the plurality of other users, the conversation list including conversation information for each of the plurality of communications with the first user with each of the plurality of other users, the conversation information for each of the plurality of other users comprising a first visual cue, a second visual cue, and user information of the plurality of other users;
displaying at least a portion of the conversation list including conversation information of the first user on a display of the first user device of the first user;
filtering the conversation list using a first criteria to identify communications for which the first user receiving the communications is to respond as a first filtered conversation list and selectively displaying a portion of the conversation list limited to the first filtered conversation list identifying the communications for which the first user receiving the communications is to respond;
filtering the first filtered conversation list using a second criteria to identify most recent ones of the plurality of communications as a second filtered conversation list and selectively displaying a portion of the conversation list limited to the second filtered conversation list identifying the most recent ones of the plurality of communications;
wherein the first visual cue is an attention icon indicating whether a response to a communication from at least one other user is due from the first user; and
wherein the second visual cue is an availability icon of other users indicating whether a user is currently available and willing to receive a communication from the first user.

2. The method of claim 1, wherein the conversation information includes media information for the previous communications.

3. The method of claim 1, wherein the conversation information includes media information selected from the group consisting of telephone calls, telephone call requests, voice messages, voice mail, electronic mail messages, and text messages.

4. The method of claim 1, wherein communications listed in the conversation list are arranged according to at least one multi-dimensional filtering scheme.

5. The method of claim 4, wherein the at least one filtering scheme includes one or more of filtering on presence, availability, location, email, phone number, network identification, title, profession company, department, location/facility, region, group affiliation, mailing list of which contact is a member, supervisor name, assistant, instant messaging address, children, spouse, notes, category, last active date, and miscellaneous fields or information.

6. The method of claim 1, wherein the conversation list includes state information of the conversation.

7. The method of claim 1, wherein the conversation list includes information of one or more of priority of each communication and status of each communication.

8. The method of claim 1, wherein the conversation list includes one or more of a sender name and time information of the conversation.

9. The method of claim 1, comprising generating the conversation list for each person of the plurality of people, wherein the conversation list includes communications of the plurality of communications that correspond to a conversation with a person.

10. The method of claim 9, wherein the conversation list includes a third indicator with one or more communications, wherein the third indicator indicates a break in a thread of the communication.

11. The method of claim 9, wherein the conversation list includes a fourth indicator with one or more communications, wherein the fourth indicator indicates when one or more states of a response to a received communication.

12. The method of claim 11, wherein the one or more states include at least one of on device, on facilitator, on server, and on destination device.

13. The method of claim 9, wherein the conversation list includes one or more of subject information and time information of the conversation.

14. The method of claim 1, comprising generating a conversation detail screen that includes a summary of message exchanges and conversation activity with each person of the plurality of people.

15. The method of claim 1, wherein the displaying is on a client device.

16. The method of claim 1, comprising updating the conversation list in response to expiry times of each of the plurality of communications.

17. A device comprising a user interface application coupled to a processor, the device configured to receive a plurality of communications by a first user associated with the device from a plurality of other users, wherein the user interface application is configured to generate a conversation list that includes conversation information corresponding to communications by the first user with each of the plurality of other users, the conversation information for each of the plurality of other users including information of another user and a type of each communication;
wherein the conversation list further comprises for each user a first visual queue associated with one or more first communications and a second visual cue associated with one or more second communications;

wherein the user interface is configured to display at least a portion of the conversation list including the first visual cue and the second visual cue on the device of the first user;

wherein the user interface is configured to filter the conversation list using a first criteria to identify communications for which the first user receiving the communications is to respond as a first filtered conversation list, and selectively display a portion of the conversation list limited to the first filtered conversation list identifying the communications for which the first user receiving the communications is to respond;

wherein the user interface is configured to filter the first filtered conversation list using a second criteria to identify most recent ones of the plurality of communications as a second filtered conversation list, and selectively display a portion of the conversation list limited to the second filtered conversation list identifying the most recent ones of the plurality of communications;

wherein the first visual cue is an attention icon indicating whether a response to a prior communication from at least one other user is due; and wherein the second visual cue is an availability icon indicating whether a user is currently available and willing to receive a communication from the first user.

18. The device of claim 17, wherein the type of communication is selected from a group consisting of telephone calls, telephone call requests, voice messages, voice mail, electronic mail messages, and text messages.

19. The device of claim 17, wherein the conversation list includes state information of the conversation.

20. The device of claim 17, wherein the conversation list includes information of one or more of priority of each communication and status of each communication.

21. The device of claim 17, wherein the conversation list includes one or more of a sender name and time information of the conversation.

22. The device of claim 17 configured to filter the conversation list using a plurality of additional criteria, wherein the plurality of additional criteria includes one or more of presence, availability, location, email, phone number, network identification, title, profession company, department, location/facility, group affiliation, mailing list of which contact is a member, supervisor name, assistant, instant messaging address, children, spouse, notes, category, last active date, and miscellaneous fields or information.

23. The device of claim 17, configured to generate the conversation list for each person of the plurality of people, wherein the conversation list includes communications of the plurality of communications that correspond to a conversation with a person.

24. The device of claim 23, wherein the conversation list includes a third indicator with one or more communications, wherein the third indicator indicates a break in a thread of the communication.

25. The device of claim 23, wherein the conversation list includes a fourth indicator with one or more communications, wherein the fourth indicator indicates when one or more states of a response to a received communication.

26. The device of claim 25, wherein the one or more states include at least one of on device, on facilitator, on server, and on destination device.

27. The device of claim 23, wherein the conversation list includes one or more of subject information and time information of the conversation.

28. The device of claim 17, configured to generate a conversation detail screen that includes a summary of message exchanges and conversation activity with each person of the plurality of people.

29. The device of claim 17, configured to update the conversation list in response to expiry times of each of the plurality of communications.

30. Logic encoded in one or more tangible medium for execution for providing a conversation-based user interface and when executed operable to:

receive communications by a first user device associated with a first user from a plurality of associated mobile devices, the plurality of associated mobile devices being associated with a plurality of users;

generate a conversation list listing the communications received from the plurality of associated mobile devices, the conversation list including conversation information corresponding to communications by a first user with each of a plurality of other users, the conversation information including user information, a first visual cue, and a second visual cue;

display at least a portion of the conversation list including conversation information of the first user on a first associated mobile device of the plurality of associated devices corresponding with the first user, the display including first and second visual cues;

filter the conversation list using a first criteria to identify communications for which the first user receiving the communications is to respond as a first filtered conversation list, and selectively display a portion of the conversation list limited to the first filtered conversation list identifying the communications for which the first user receiving the communications is to respond;

filter the first filtered conversation list using a second criteria to identify most recent ones of the plurality of communications as a second filtered conversation list, and selectively display a portion of the conversation list limited to the second filtered conversation list identifying the most recent ones of the plurality of communications;

wherein the first visual cue is an attention icon associated with each of the plurality of other users indicating whether a response to a communication from at least one other user associated with the first visual cue is due from the first user; and wherein the second visual cue is an availability icon indicating whether a user is currently available and willing to receive a communication from the first user.

* * * * *